United States Patent [19]

Meyer et al.

[11] Patent Number: 4,821,582

[45] Date of Patent: Apr. 18, 1989

[54] LOAD TRANSDUCER

[75] Inventors: Richard A. Meyer, Carver; Douglas J. Olson, Plymouth, both of Minn.

[73] Assignee: MTS Systems Corporation, Eden Prairie, Minn.

[21] Appl. No.: 127,641

[22] Filed: Dec. 2, 1987

[51] Int. Cl.$^4$ .............................................. G01L 5/16
[52] U.S. Cl. ................................... 73/862.04; 73/146
[58] Field of Search ............................. 73/862.04, 146

[56] References Cited

U.S. PATENT DOCUMENTS

| | | | |
|---|---|---|---|
| 3,780,573 | 12/1973 | Reus | 73/146 |
| 4,448,083 | 5/1984 | Hayashi | 73/862.04 |
| 4,640,138 | 2/1987 | Meyer et al. | 73/862.04 |

Primary Examiner—Charles A. Ruehl
Attorney, Agent, or Firm—Kinney & Lange

[57] ABSTRACT

A load transducer used for determining loads on a tire in a tire testing apparatus has very high stiffness and a high natural frequency. A tire support spindle has an end plate mounted on one end of the transducer on a center support sleeve which is supported relative to an outer housing at spaced locations in direction along the wheel rolling axis. The support sleeve is supported relative to the outer housing at each end by four arms or beams that operate as shear beams in reaction to the vertical and rolling loads on the tire, and the corresponding moments created by these two forces or loads. Forces on the tire at the tire rolling radius parallel to the rolling axis of the tire are also measured by bending the support beams.

9 Claims, 2 Drawing Sheets

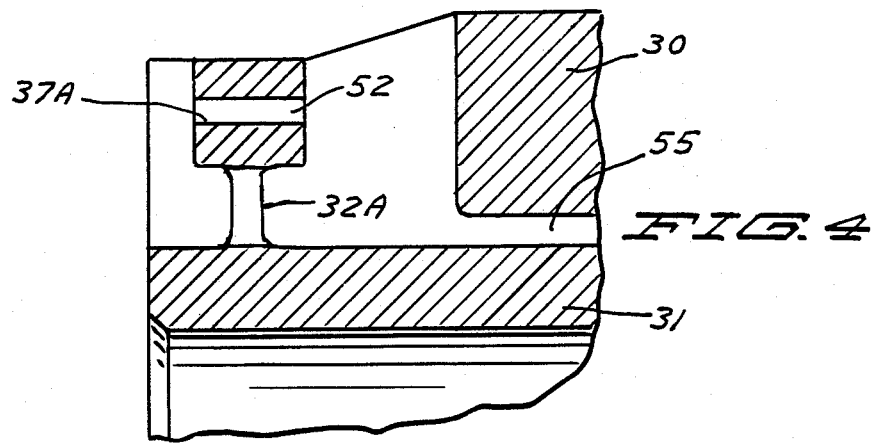
FIG. 4
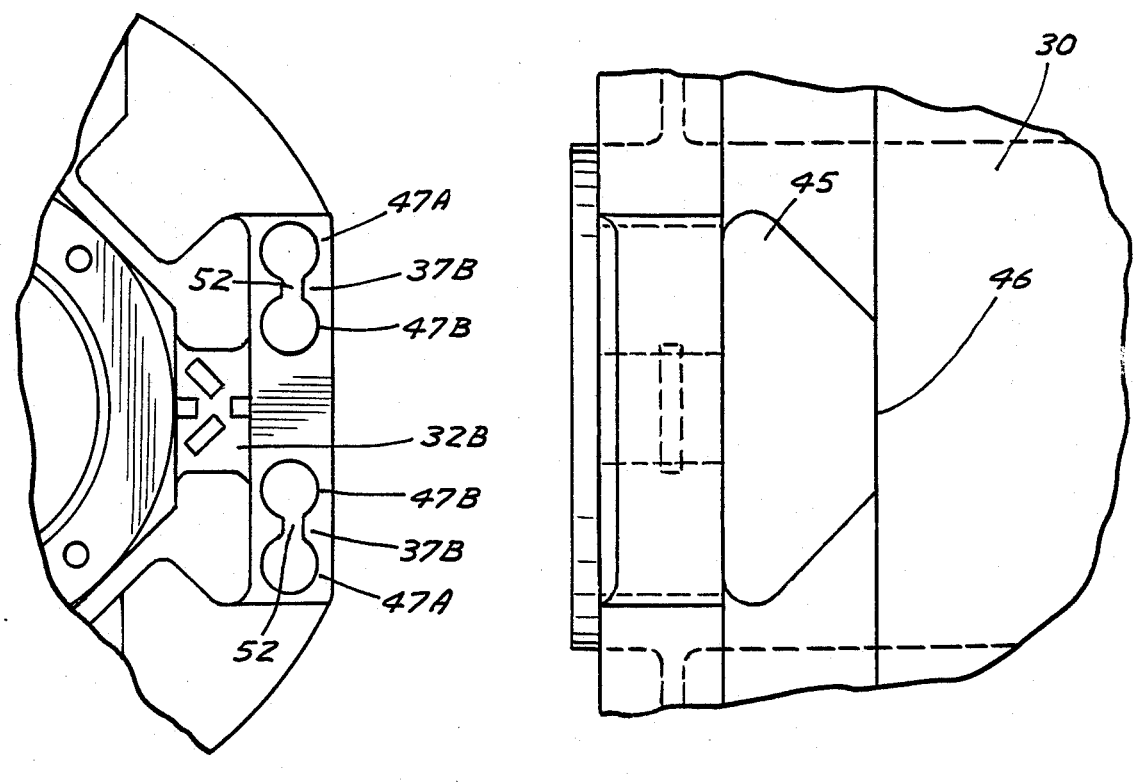
FIG. 5
FIG. 6

LOAD TRANSDUCER

BACKGROUND OF THE INVENTION

1. Field of the Invention

The present invention relates to a load transducer that measures linear forces in three axes and moments about two of the axes.

2. Description of the Prior Art.

U.S. Pat. No. 4,640,138, issued Feb. 3, 1087, illustrate a multiple axis load-sensitive transducer utilizing a one-piece construction, with inner and outer members that are joined by a pair of axially spaced spiders. The spiders comprise arms that are integral with the inner housing and are connected to the outer housing by flexible straps that have longitudinal lengths with the ends of the straps fixed to the outer housing. The arms of the spiders are fixed to the center of the associated strap. Loads are sensed as a function of bending in the spider arms.

The present invention illustrates a transducer which has inner and outer housings connected by load-sensitive spider arms or shear beams. The outer ends of the spider are connected to the outer housing by links which are stiff when the inner housing is loaded in direction along an axis perpendicular to the plane of the spider relative to the outer housing.

SUMMARY OF THE INVENTION

The present invention relates to a load transducer which measures loads in three linear axes and moments about two of the axes. The transducer has low hysteresis, and very high rigidity and high natural frequency in the three linear degrees of freedom and the three rotational degrees of freedom.

The transducer includes an inner housing supporting a member being loaded at one end. In the form shown, the loaded member is a tire mounted on a wheel which rolls about a central axis. The inner housing is mounted to an outer housing, with two spaced spiders comprising shear beams or arms extending radially from the inner housing to the outer housing. The shear beams are integral at their first ends with the inner housing, and are connected integrally to the outer housing through flexure links that have longitudinal axes extending parallel to the plane of the spider. The shear beams are integral with the center portions of the respective flexure links. The flexure links each have opposite ends that are fixed to the outer housing through a pair of flexible straps at each end forming a four-bar support linkage at each end of the respective flexure link. In other words, the straps, which are very flexible in a radial direction of the central axis, are spaced apart in such radial direction and form two parallel acting straps at each end of the flexure link. The straps are very rigid in axial direction of the transducer, and are quite flexible along a radial line through the center of the flexure link. Stated another way, the flexure links are very stiff in directions parallel to their longitudinal axes and resist twisting about their longitudinal axes.

The transducer is specifically designed to be used for testing tires on tire testing machines, and to measure the load in fore and aft direction (X axis), and vertical loads (Z axis) and axial loads (Y axis) on the tire as well as moments about the vertical (Z) axis of the tire (steering loads) and moments about the fore and aft (X) axis.

The inner housing is used for holding the hub of a tire to be tested, and the outer housing is then supported onto a tire test machine and can be controlled for steering, movement including camber, as well as for vertical movement and loading.

BRIEF DESCRIPTION OF THE DRAWINGS

FIG. 4 is a fragmentary sectional view taken as on line 4—4 in FIG. 2;

FIG. 5 is an enlarged front end elevational view showing a beam used for connecting an inner housing of the transducer to an outer housing thereof; and FIG. 6 is an outer plan view of a supporting flexure link for the beam shown in FIG. 6.

DETAILED DESCRIPTION OF THE PREFERRED EMBODIMENTS

Figure 1:
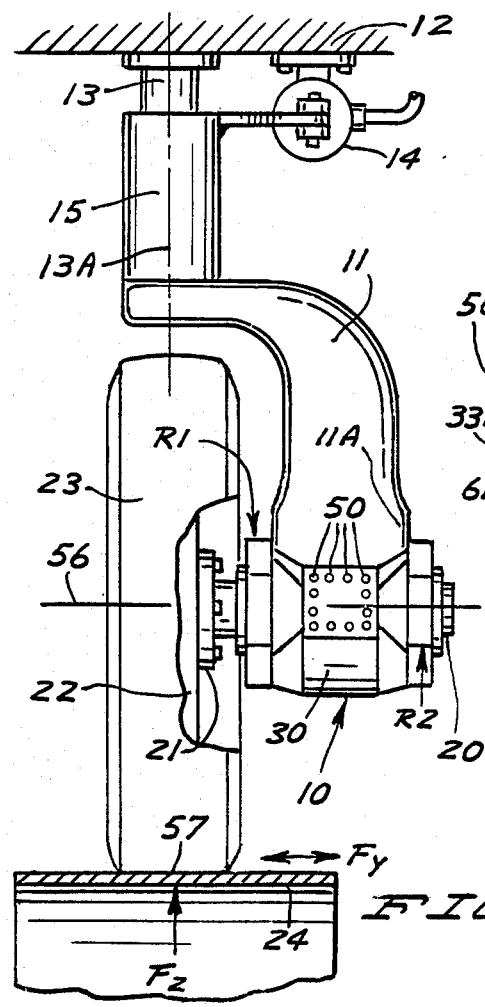
FIG. 1 is a schematic front elevational view of a typical tire test arrangement, having a transducer made according to the present invention installed thereon.

A five component load transducer illustrated generally at 10 is shown mounted onto a tire tester support arm 11 that is in turn mounted onto a frame 12 through a pivot support 13. The arm is controlled for steering movement about the axis 13A of the pivot support 13 with a steering actuator or cylinder 14. A hub 15 is rotatably mounted on the support 13, and is controlled for pivotal steering movement about axis 13A.

Load transducer 10 supports a wheel hub member 21, that in turn rotatably supports a wheel 22 that has a pneumatic tire 23 thereon, which is to be tested. An endless belt 24 is driven to in turn rotate the tire 23, while loading and steering movements can be applied to the tire at the same time. The tire 23 will rotate about a wheel axis which as shown is the Y axis on bearings 25. The hub 15 is also controlled for movement axially in direction along the axis 13A of the support 13 to load the tire against the belt and is pivoted for simulating steering loads. This can be done by loading the support 13 with an actuator in direction along axis 13A. The belt 24 is supported on its underside during the test, in a normal manner, as shown in U.S. Pat. No. 4,344,324.

The transducer 10 is made as a unitary body, that is, it is made from a single block of material in order to reduce hysteresis and improve repeatability and to provide adequate low force responses. As shown, the transducer 10 comprises an outer housing 30, and an inner housing 31, which are supported relative to each other only through spiders formed of four radial beams (called shear beams for identification) at opposite ends of the housing. Shear beams 32A, 32B, 32C and 32D, respectively, are at the end of the transducer adjacent to the tire, and shear beams 34A-34D are positioned at the end of the transducer farthest from the tire. The shear beams are positioned 90° from each other and extend radially from the inner housing. The shear beams are each integrally supported to the outer housing 30 through separate load carrying flexure links or beams 33A-33D and 35A-35D, respectively, at the opposite ends of the outer housing.

Flexure links 33A-33D and 35A-35D are integrally joined at their center portions to the outer ends of the respective shear beams 32A-32D and 34A-34D. The opposite ends of each of the flexure links 33A-33D and 35A-35D each have a pair of parallel flexure straps that connect in turn to the outer housing. The flexure straps are shown at 37A, 37B, 37C and through 37D for the flexure links 33A–33D, and straps are formed for connecting the flexure links 35A–35D to the outer housing, such as the strap indicated at 38B. The straps for the flexure links at the end of the transducer spaced from the tire are the same as the straps for the flexure links adjacent the tire.

The inner housing 31 is completely free from the outer housing 30, except for the shear beam connections. The inner and outer housings are made as a unitary assembly from one block of material by removing metal to form the shear beams and the flexure links. The shear beams 32A–32D and 34A–34D are formed using known machining processes including EDM removal of material to define the shear beams and flexure links and separate the inner housing from the outer housing. The straps 37A–37D and the straps for flexure links 35A–35D comprise four bar linkages that support the respective outer end of the shear beams relative to the outer housing. The straps at each end of the links 33A–33D and 35A–35D are spaced apart by formed slots 52 in the center portion, and are joined at first ends to the outer housing through thin hinge sections 47A and to the center portion of the flexure links by hinge portion 47B (FIG. 5). The straps 37A–37D are effectively hinged at the hinge portions 47A and 47B, which will bend under loads perpendicular to the plane of the straps. Thus, the individual connecting straps are flexible and have low rigidity in direction perpendicular to the plane defined by the straps, but are very rigid in all other directions.

Figure 3:
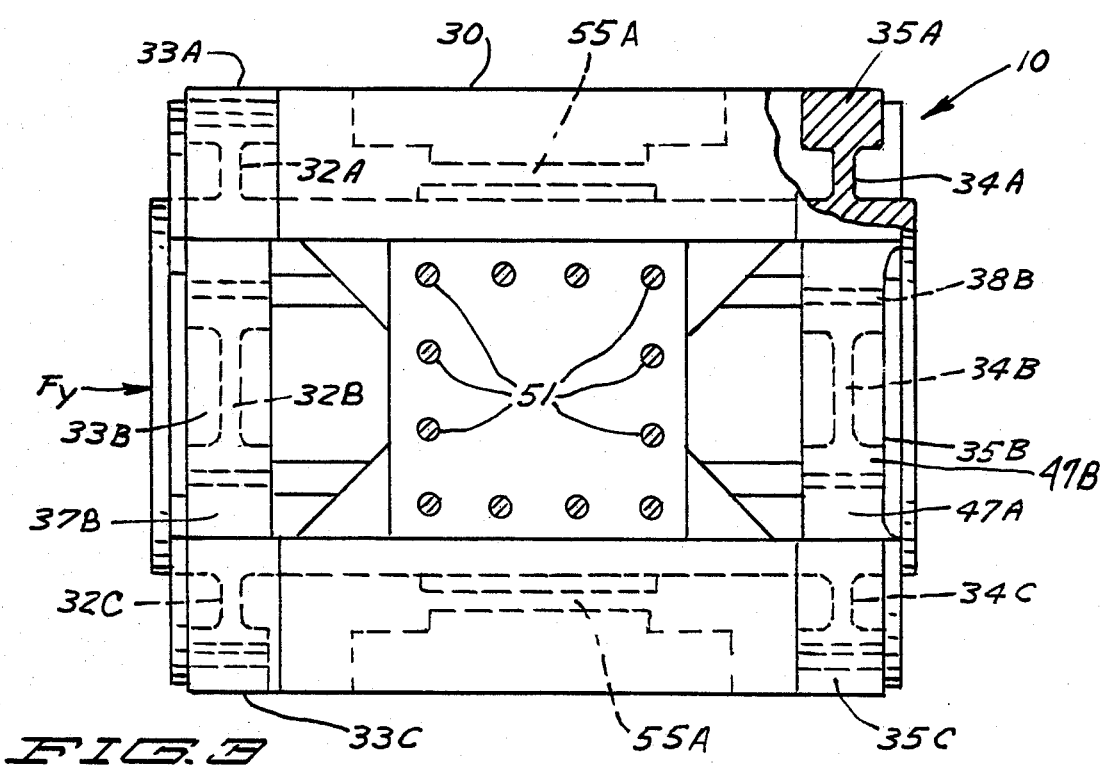
FIG. 3 is an enlarged front elevational view of the device shown in FIG. 1.

The arm 11 has a coupling yoke 11A at its lower end that fits over the top of the outer housing 30 and along the sides of the outer housing, and is bolted securely to the outer housing 30 with capscrews 50, as shown in FIG. 1, using threaded openings 51 in the transducer outer housing as shown in FIG. 3.

The inner housing 31 and the outer housing 30 are separated by axially extending slots indicated at 55, at the 45° positions relative to the bisecting radial planes of the shear beams. Slots 55A are formed to separate the inner and outer housings at locations between the shear beams on opposite ends of the transducer. The inner and outer housings 31 and 30 are free from each other except for connections through the respective shear beams and flexure links.

Two strain gauges 60 are positioned on each of the shear beams at 45° to the respective central radial axes of the shear beams. Strain gauges 61 are also placed on the shear beams oriented to be centered on and extend along the central radial axes of the shear beams to measure bending of the shear beams. The shear strain in the shear beams can be sensed accurately by gauges 60 and bending is sensed by gauges 61, with a sufficiently high signal so that the loads carried can be determined.

The vertical load on the tire that represents the weight of the automobile (along the Z axis) is represented by $F_Z$; the load in direction along the rotational axis (the Y axis), indicated at 56 is $F_Y$ at the tire patch area 57 between the belt 24 and the tire 23. The rolling load at the tire path, that is, the fore and aft load between the tire and the belt 24 that tends to make the tire rotate (or stop rotating under brake loads) is along the X axis and is represented by $F_X$ (see FIG. 2). The shear beams 32A–32D form a spider and lie on a plane $R_1$ (see FIG. 1), which is the load reaction plane adjacent to the tire. Shear beams 34A–34D form a spider and lie on a second load reaction plane $R_2$ at the remote end of the transducer. These load reaction planes are spaced apart a desired amount (or essentially on a wheel base) and the precise loading on the tire can be obtained in all normal directions of load during use. The only load that is not determined by the transducer is the braking torque resulting if brakes are applied.

Figure 2:
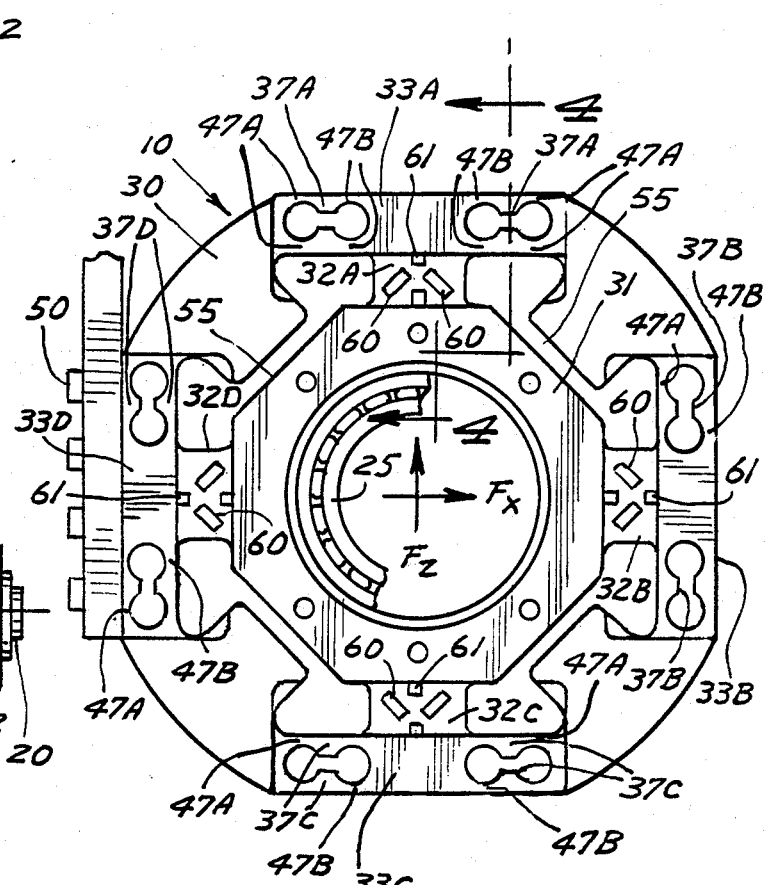
FIG. 2 is an end elevational view of the transducer of FIG. 1.

The normal loads can all be sensed while the tire is steered about the axis of the support 13, as well. $F_z$ (vertical) loads are measured by shear in the shear beams, and the moment loading on the wheel hub can be calculated by using the distance between the $R_1$ plane and the $R_2$ plane. Since shear beams are being used, there has to be stiff moment restraint about the rolling axis, and the flexure links 33A–33D and 35A–35D provide this stiffness against rotating moments. The flexure links are very stiff in direction along their longitudinal axis length, which is measured in a plane perpendicular to the tire rolling axis 56. The flexure links 33A–33D and 35A–35D are flexible, however, in direction perpendicular to their planes which direction of flexibility is along radial lines from the transducer axis bisecting the respective flexure links. Thus, when loading in the "Z" direction in FIGS. 1 and 2 (perpendicular to and radial to the axis 56), the loads are carried through the beams 32B and 32D at loading plane $R_1$ (and beams 34B and 34D at loading plane $R_2$) because the flexure links 33B and 33D at loading plane $R_1$ (and flexure links 35B and 35D at loading plane $R_2$) are stiff in that direction (as seen in FIG. 2) and flexure links 33A and 33C (and links 35A and 35C) flex easily in the Z direction shown in FIG. 2. Loads in the X direction, perpendicular to the Z direction as shown in FIG. 2, are reacted into shear beams 32A and 32C (and 34A and 34C), because the flexure links 33A and 33C (and the links 35A and 35C) carry loads in the X direction, and links 33B, 33D, and 35B, 35D flex easily in the X direction.

Loading in the Y direction, that is, generally parallel to the axis 56, causes bending in the shear beams 32A–32D and 34A–34D where they join the inner housing and their respective flexure link, which is sensed by the strain gauges 61. The flexure links 33A–33D and 35A–35D have rigidity against twisting because of the spacing of the flexure straps, as they do not yield under loads in the Y direction. The $F_y$ loads are sensed by strain gauges 61. The spaced straps 37A–37D at each end of the flexure links provide parallel link motion and resistance to twisting as the inner housing is loaded in a direction along axis 56.

As stated, the flexure links flex easily in the direction perpendicular to the planes of the flexure links, which planes are parallel to axis 56 and lie on the central longitudinal axis of the beams. Stated another way, of the six degrees of freedom, the flexure system is compliant in one axis and stiff in all other degrees of freedom.

The thin hinge sections 47A and 47B at each of the straps 37A–37D at the ends of each of the flexure links isolate the load-induced strain on the individual shear beams from loads on the other shear beams, and essentially decouple the sensed loads from each other. Thus, the individual shear loads sensed by each pair of shear beams when acting in shear can be determined if desired and this permits flexibility in calculating the loads desired from the test.

The positioning of the strain gauges 61, at the inner and outer ends of the shear beams 32A–32D and 34A-34D, respectively, permits using them in a strain gauge bridge because the rigidity of the flexure links 33A-33D and 35A-35D in resisting movement of the inner housing relative to the outer housing in direction along the axis 56 insures that there will be equal bending at both positions of strain gauges 61 on each shear beam, adjacent the respective ends of the shear beams.

All loads in the Z and X axes, as well as the moments about the Z and X axes, are measured in shear in the shear beams, rather than bending as shown in prior U.S. Pat. No. 4,640,138.

Again, the moments about the X and the Z axes can be measured easily, taking into account the spacing between the loading planes $R_1$ and $R_2$. The $F_Z$ loads at plane $R_1$ cause shear in shear beams 32B and 32D and in shear beams 34B and 34D. The strain gauges 60 on the pairs of shear beams at each end of the transducer (at planes $R_1$ and $R_2$) can be connected in a full bridge with half of the gauges in tension and half in compression.

The $F_X$ loads at plane $R_1$ cause shear in shear beams 32A and 32C and shear in shear beams 34A and 34C at the $R_2$ plane. The strain gauges 60 on the pairs of shear beams at each end of the transducer sensitive to $F_X$ loads can be connected in a full bridge with half of the gauges in tension and half of the gauges in compression.

All of the strain gauges 61 which measure bending are connected in one bridge to measure $F_Y$ loads.

The transducer can be made with only one set of shear beams 32A-32D, or in other words with only one spider (for example the spider at loading plane $R_1$), if desired for particular applications.

The shear beams 32A-32D and 34A-34D tend to take an "S" shape at both ends of the trandsucer under loading along the axis 56. In other words, the shear beams are fixed at both their inner and outer ends, with one end being fixed to the respective flexure link, which resists twisting, and the other end being fixed to the inner housing. The shear beams have to assume a curved configuration for any movement of the inner housing relative to the outer housing in direction along the axis 56.

Although the present invention has been described with reference to preferred embodiments, workers skilled in the art will recognize that changes may be made in form and detail without departing from the spirit and scope of the invention.

What is claimed is:

1. A load transducer for measuring loads in a plurality of axes including:
    an outer housing;
    an inner housing;
    a plurality of load sensitive shear beams connecting said inner and outer housings, said shear beams being separated and extending generally radially from the inner housing toward the outer housing, the shear beams being aligned in a plane generally perpendicular to a reference axis of the inner housing; and
    flexure links for connecting the radial outer ends of said, shear beams to said outer housing, said flexure links each having a longitudinal axis lying in a common plane perpendicular to the reference axis of the inner housing, and a pair of strap means at each end of each of the flexure links, said strap means being integral parts of the respective flexure link and spaced apart in a direction lying parallel to a radial line at each end of the respective flexure link, each strap means being fixed to the outer housing.

2. The apparatus of claim 1 wherein said inner housing, said outer housing, said shear beams and said flexure links are formed from a unitary block of material.

3. The apparatus as specified in claim 1 wherein said flexure links are made so that they will bend easily in a direction parallel to a radial line from the reference axis of said inner housing through the center of that flexure link.

4. The apparatus as specified in claim 1 and strain gauge means for measuring the shear in each of said shear beams caused by loading along lines parallel to radial lines from the reference axis positioned at 60 to the radial lines from the reference axis and bisecting the respective shear beams.

5. The apparatus as specified in claim 1 wherein there are two sets of shear beams spaced in direction along the reference axis of said inner housing, said two sets of shear beams being separated from each other, and each having a separate flexure link connecting the radially outer ends thereof to the outer housing.

6. A load transducer having an inner housing and an outer housing that are concentric about a reference axis and are unconnected from each other except by spider means;
    said spider means comprising a plurality of radially extending shear beams, sufficient in number to support the inner and outer housings in a concentric position during use, said shear beams being integrally formed with the inner housing at the inner ends of the shear beams, and the radially outward ends of the shear beams extending outwardly toward the outer housing; and
    means for connecting the outer ends of the shear beams to the outer housing comprising flexure links having a center portion fixed to the radial outer ends of said shear beams, said flexure links each having a pair of spaced apart flexure straps at opposite ends thereof integrally formed at the center portions, said flexure straps being flexible in directions parallel to a radial center line of the associated shear beam, the flexure link having the flexure straps being individually hingedly coupled to the outer housing to hingedly flex under loads in the directions parallel to the radial center line of the respective shear beam and being of sufficient size to carry substantial loads in direction along said reference axis, and loads parallel to the longitudinal axis of the flexure links.

7. The load transducer of claim 6 wherein the inner and outer housings are supported by a pair of substantially identical spider means which are spaced in direction along the reference axis, and each spider means being constructed as the first mentioned spider means.

8. The load transducer of claim 7 and strain gauge means positioned on said shear beams to sense shear therein occasioned by loads on the inner housing relative to the outer housing.

9. The load transducer as specified in claim 6 wherein the inner housing, the outer housing, the shear beams and the flexure links are unitarily formed by removing material from a single block of material.

* * * * *

UNITED STATES PATENT AND TRADEMARK OFFICE
CERTIFICATE OF CORRECTION

PATENT NO. : 4,821,582

DATED : April 18, 1989

INVENTOR(S) : Richard A. Meyer et al.

It is certified that error appears in the above-identified patent and that said Letters Patent is hereby corrected as shown below:

Col. 5, Line 61, after "said", delete the comma.

Col. 6, Line 16, delete "60" insert "90".

Signed and Sealed this

Fourteenth Day of November, 1989

*Attest:*

JEFFREY M. SAMUELS

*Attesting Officer*  *Acting Commissioner of Patents and Trademarks*